United States Patent
Jung

(10) Patent No.: US 9,738,263 B2
(45) Date of Patent: Aug. 22, 2017

(54) ELECTRO-HYDRAULIC BRAKE SYSTEM AND METHOD FOR CONTROLLING THE SAME

(71) Applicant: Hyundai Motor Company, Seoul (KR)

(72) Inventor: Young Suk Jung, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/951,823

(22) Filed: Nov. 25, 2015

(65) Prior Publication Data

US 2016/0347298 A1    Dec. 1, 2016

(30) Foreign Application Priority Data

May 29, 2015    (KR) .................. 10-2015-0075820

(51) Int. Cl.
| | | |
|---|---|---|
| *B60T 13/74* | (2006.01) | |
| *B60T 8/40* | (2006.01) | |
| *B60T 7/04* | (2006.01) | |
| *B60T 13/16* | (2006.01) | |

(Continued)

(52) U.S. Cl.
CPC ............ *B60T 13/745* (2013.01); *B60T 7/042* (2013.01); *B60T 8/4081* (2013.01); *B60T 13/166* (2013.01); *B60T 13/662* (2013.01); *B60T 13/686* (2013.01); *B60T 2270/402* (2013.01);

(Continued)

(58) Field of Classification Search
CPC .... B60T 8/4031; B60T 8/4072; B60T 8/4081; B60T 8/4018; B60T 8/4275; B60T 13/741; B60T 13/16; B60T 13/161; B60T 13/20; B60T 2270/82

See application file for complete search history.

(56) References Cited

U.S. PATENT DOCUMENTS

| | | | | |
|---|---|---|---|---|
| 6,402,264 B1 * | 6/2002 | Otomo | .................. | B60T 8/4063 |
| | | | | 303/11 |
| 9,156,457 B2 * | 10/2015 | Kim | ......................... | B60T 7/042 |
| 9,205,824 B2 * | 12/2015 | Feigel | .................... | B60T 8/4081 |

(Continued)

FOREIGN PATENT DOCUMENTS

| | | | |
|---|---|---|---|
| JP | 2002-104173 A | 4/2002 | |
| JP | 2007-112293 A | 5/2007 | |

(Continued)

*Primary Examiner* — Thomas J Williams
(74) *Attorney, Agent, or Firm* — Morgan, Lewis & Bockius LLP

(57) ABSTRACT

An electro-hydraulic brake system may include a brake input device manipulated by a driver to brake a vehicle, a brake input detecting sensor configured to detect a brake input value of the driver through the brake input device, a pressure generating device configured to generate a brake hydraulic pressure, a wheel cylinder configured to receive the brake hydraulic pressure generated from the pressure generating device and to generate braking power for braking rotations of each vehicle wheel, a hydraulic pressure supply line connected between the pressure generating device and the wheel cylinder to transfer the brake hydraulic pressure generated from the pressure generating device to each wheel cylinder, and a controller configured to output a control signal for controlling an operation of the pressure generating device to allow the pressure generating device to generate a target brake hydraulic pressure based on a signal of the brake input detecting sensor.

16 Claims, 4 Drawing Sheets

(51) Int. Cl.
 *B60T 13/66* (2006.01)
 *B60T 13/68* (2006.01)
(52) U.S. Cl.
 CPC ..... *B60T 2270/404* (2013.01); *B60T 2270/82* (2013.01)

(56) References Cited

U.S. PATENT DOCUMENTS

| | | | | |
|---|---|---|---|---|
| 9,308,905 | B2* | 4/2016 | Biller | B60T 8/4081 |
| 2014/0028084 | A1* | 1/2014 | Biller | B60T 8/4081 303/9.62 |
| 2014/0110997 | A1* | 4/2014 | Biller | B60T 8/4081 303/9.62 |
| 2014/0203626 | A1* | 7/2014 | Biller | B60T 8/4081 303/10 |
| 2014/0225425 | A1* | 8/2014 | Drumm | B60T 7/042 303/9.75 |
| 2016/0009267 | A1* | 1/2016 | Lesinski, Jr. | B60T 8/885 303/10 |
| 2016/0272178 | A1* | 9/2016 | Feigel | B60T 8/4081 |

FOREIGN PATENT DOCUMENTS

| | | |
|---|---|---|
| JP | 5453752 B2 | 3/2014 |
| KR | 10-2007-0104982 A | 10/2007 |
| KR | 10-2008-0100588 A | 11/2008 |
| KR | 10-2011-0110334 A | 10/2011 |
| KR | 10-2013-0104159 A | 9/2013 |
| KR | 10-2013-0105960 A | 9/2013 |
| KR | 10-1324995 B1 | 11/2013 |
| KR | 10-1401610 B1 | 5/2014 |
| KR | 10-2014-0134570 A | 11/2014 |
| KR | 10-2014-0135043 A | 11/2014 |
| KR | 10-2014-0140404 A | 12/2014 |

* cited by examiner

ELECTRO-HYDRAULIC BRAKE SYSTEM AND METHOD FOR CONTROLLING THE SAME

CROSS-REFERENCE TO RELATED APPLICATION

The present application claims priority to Korean Patent Application No. 10-2015-0075820 filed May 29, 2015, the entire contents of which is incorporated for all purposes by this reference.

BACKGROUND OF THE INVENTION

Field of the Invention

The present invention relates to an electro-hydraulic brake system and a method for controlling the same, and more particularly, to an electro-hydraulic brake system which generates sufficient braking force to secure safety even when a pump for generating a hydraulic pressure necessary to generate braking force is out of order, and a method for controlling the same.

Description of Related Art

Recently, a vehicle brake apparatus has employed a brake-by-wire technique by which, instead of a general hydraulic pressure control system, an electronic control system is applied thereto for control.

Such an electronic control brake apparatus generates the required hydraulic pressure by using an electric motor according to driver braking intention and transfers the hydraulic pressure generated by driving the motor to each wheel brake (wheel cylinder) to generate the braking force.

The electronic control brake apparatus, which controls the hydraulic pressure by using an electronic actuator, is generally called an electro-hydraulic brake system (EHB).

The electro-hydraulic brake system can easily and individually control the brake force generated from each wheel, so that electronic stability control (ESC) or an anti-lock brake system (ABS) is easily implemented.

According to a conventional electro-hydraulic brake system, as the electric actuator described above, a pump has been widely used, in which a piston is reciprocated by converting torque into linear force when a motor is driven and presses the brake oil in a chamber of a cylinder to generate a hydraulic pressure.

In addition, after sensing a pedal stroke caused by a driver pedal operation through a sensor, the electro-hydraulic brake system controls the braking force of each wheel with the hydraulic pressure generated by the operations of the motor and the pump.

In addition, the electro-hydraulic brake system includes a pedal simulator for allowing a driver to feel a pedal pressure like a general hydraulic brake apparatus.

Thus, when a driver steps on a pedal connected to a backup master cylinder to press the pedal, the hydraulic pressure of the brake oil inside the backup master cylinder is increased and the hydraulic pressure of the backup master cylinder is transferred to the pedal simulator through a pedal hydraulic line to generate pedal feel.

In addition, when a driver steps on a brake pedal, a controller calculates a driver desired target hydraulic pressure based on a driver pedal input value (brake input value), that is, a pedal stroke value, sensed through a brake pedal sensor (pedal stroke sensor), and controls the operation of a motor to allow the pump to generate a hydraulic pressure according to the calculated target hydraulic pressure. Then, the hydraulic pressure generated from the pump is transferred to each wheel cylinder to obtain the desired braking power.

However, since the electro-hydraulic brake system according to the related art generates and controls the hydraulic pressure required to generate the braking power by using only one pump driven by a motor without regard to the braking condition, the electro-hydraulic brake system requires a large size of a pump.

The pump having a large size has too heavy weight and is very expensive due to a manufacturing problem.

In addition, when a pump is failed, for example, when the motor is out of order, since the braking force is generated only by pedaling force of a driver in emergency, that is, the hydraulic pressure of the backup master cylinder, it is difficult to secure sufficient braking power so that the brake stability is deteriorated and braking distance is increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an electro-hydraulic brake system which may improve the weight and manufacturing cost of the electro-hydraulic brake system according to the related art and prevent deterioration of the brake stability and an increase in the braking distance due to the insufficient braking power when a pump is out of order, and a method for controlling the same.

According to various aspects of the present invention, an electro-hydraulic brake system may include a brake input device manipulated by a driver to brake a vehicle, a brake input detecting sensor configured to detect a brake input value of the driver through the brake input device, a pressure generating device configured to generate a brake hydraulic pressure, a wheel cylinder configured to receive the brake hydraulic pressure generated from the pressure generating device and to generate braking power for braking rotations of each vehicle wheel, a hydraulic pressure supply line connected between the pressure generating device and the wheel cylinder to transfer the brake hydraulic pressure generated from the pressure generating device to each wheel cylinder, and a controller configured to output a control signal for controlling an operation of the pressure generating device in order to allow the pressure generating device to generate a target brake hydraulic pressure based on a signal of the brake input detecting sensor, in which the pressure generating device includes a main pump and a supplementary pump, each of which generates a brake hydraulic pressure according to the control signal of the controller and is connected to the hydraulic pressure supply line to transfer the generated brake hydraulic pressure through the hydraulic pressure supply line.

The brake input detecting sensor may include a pedal stroke sensor for detecting a stroke of a brake pedal which serves as a brake input device.

The main pump and the supplementary pump may be piston compression pumps, in each of which a piston receives linear force, into which torque of a motor controlled according to the control signal of the controller is converted, to reciprocate in a cylinder, such that brake oil in the cylinder is pressed against to generate the brake hydraulic pressure.

Each of the main pump and the supplementary pump may include a motor driven according to the control signal of the controller, a ball screw mounted on a rotational shaft of the motor to be rotated together with the rotational shaft, and a piston operated by the linear force, into which the torque of the motor is converted through the ball screw in a state that the piston is engaged with the ball screw, to press against the brake oil in the cylinder.

The hydraulic pressure supply line may be connected to a sub-hydraulic pressure line connected to each pump, such that the brake hydraulic pressures generated by at least one of the main and supplementary pumps are transferred simultaneously or separately through the hydraulic supply line, and the electro-hydraulic brake system may further include a check valve disposed on one of a sub-hydraulic pressure line connected from the main pump to the hydraulic pressure supply line and a sub-hydraulic pressure line connected from the supplementary pump to the hydraulic pressure supply line, and a shut-off valve disposed on another sub-hydraulic pressure line.

The electro-hydraulic brake system may further include a backup master cylinder connected to a brake pedal serving as the brake input device to generate a hydraulic pressure when the brake pedal is manipulated, and a pedal simulator connected to the backup master cylinder through a pedal hydraulic line to provide pedal feel through the hydraulic pressure generated from the backup master cylinder according to pedaling force of a driver, in which the controller may be set to separate the pedal hydraulic pressure line and the hydraulic pressure supply line from each other by closing a cut valve between the pedal hydraulic pressure line and the hydraulic pressure supply line and to open a release valve of the hydraulic pressure supply line, such that the brake hydraulic pressure is generated and transferred to the wheel cylinder.

The controller may be configured to determine a driver request deceleration based on the brake input value of the driver detected by the brake input device, and to select one from the main and supplementary pumps according to the determined driver request deceleration to operate the selected pump or all the main and supplementary pumps, such that the brake hydraulic pressure is generated.

The controller may be configured to operate all the main and supplementary pumps when the determined driver request deceleration is greater than a first set value, and one selected from the main and supplementary pumps when the determined driver request deceleration is equal to or less than the first set value to generate the brake hydraulic pressure.

The controller may be configured to operate the main pump when the determined driver request deceleration is equal to or less than the first set value and equal to or greater than a second set value and a vehicle speed is equal to or greater than a set vehicle speed, and to operate the supplementary pump when the determined driver request deceleration is less than the second set value or a vehicle speed is less than the set vehicle speed.

The controller may be configured to operate all the main and supplementary pumps to generate the brake hydraulic pressure when an anti-lock brake system (ABS) is operated or occurrence of a brake fade is sensed.

The controller may be configured to operate a normal pump of the main and supplementary pumps to generate the brake hydraulic pressure when it is sensed that one of the main and supplementary pumps is abnormal.

According to various aspects of the present invention, a method of controlling an electro-hydraulic brake system may include determining, by a controller, a target hydraulic pressure for generating a brake power based on a driver brake input value detected by a brake input detecting sensor when a driver manipulates a brake input device in order to brake a vehicle, selecting, by the controller, one from main and supplementary pumps connected to a hydraulic pressure supply line in order to generate the brake hydraulic pressure based on the driver brake input value, operating, by the controller, one selected from the main and supplementary pumps or all the main and supplementary pumps according to the driver brake input value in order to generate and control a brake hydraulic pressure according to the determined target hydraulic pressure as a target value, and generating braking force, by the controller, for braking rotations of vehicle wheels by transferring the generated brake hydraulic pressure to wheel cylinders of each vehicle wheel through the hydraulic pressure supply line.

The brake input detecting sensor may be a pedal stroke sensor for detecting a stroke of a brake pedal serving as a brake input device.

The main pump and the supplementary pump may be piston compression pumps, in each of which a piston receives linear force, into which torque of a motor is converted, to reciprocate in a cylinder, such that brake oil in the cylinder is pressed to generate the brake hydraulic pressure.

The electro-hydraulic brake system may include a backup master cylinder connected to a brake pedal serving as the brake input device to generate a hydraulic pressure when the brake pedal is manipulated, and a pedal simulator connected to the backup master cylinder through a pedal hydraulic pressure line to provide pedal feel through the hydraulic pressure generated from the backup master cylinder according to pedaling force of a driver, and the pedal hydraulic pressure line and the hydraulic pressure supply line may be separated from each other by closing a cut valve between the pedal hydraulic pressure line and the hydraulic pressure supply line before the brake hydraulic pressure is generated, and a release valve of the hydraulic pressure supply line may be opened such that the brake hydraulic pressure generated by one or all of the main and supplementary pumps may be transferred to the wheel cylinders of each vehicle wheel through the hydraulic pressure supply line.

A driver request deceleration may be determined based on the brake input value of the driver detected by the brake input device, and one or all of the main and supplementary pumps may be selected according to the determined driver request deceleration to operate the selected pump or all the main and supplementary pumps, such that the brake hydraulic pressure is generated.

The main and supplementary pumps may be simultaneously operated when the determined driver request deceleration is greater than a first set value, and one selected from the main and supplementary pumps may be operated to generate the brake hydraulic pressure when the determined driver request deceleration is equal to or less than the first set value.

The main pump may be operated when the determined driver request deceleration is equal to or less than the first set value and equal to or greater than a second set value and a vehicle speed is equal to or greater than a set vehicle speed, and the supplementary pump may be operated when the determined driver request deceleration is less than the second set value or the vehicle speed is less than the set vehicle speed.

All the main and supplementary pumps may be simultaneously operated to generate the brake hydraulic pressure when an anti-lock brake system (ABS) is operated or occurrence of a brake fade is sensed.

A normal pump of the main and supplementary pumps may be operated to generate the brake hydraulic pressure when it is sensed that one of the main and supplementary pumps is abnormal.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
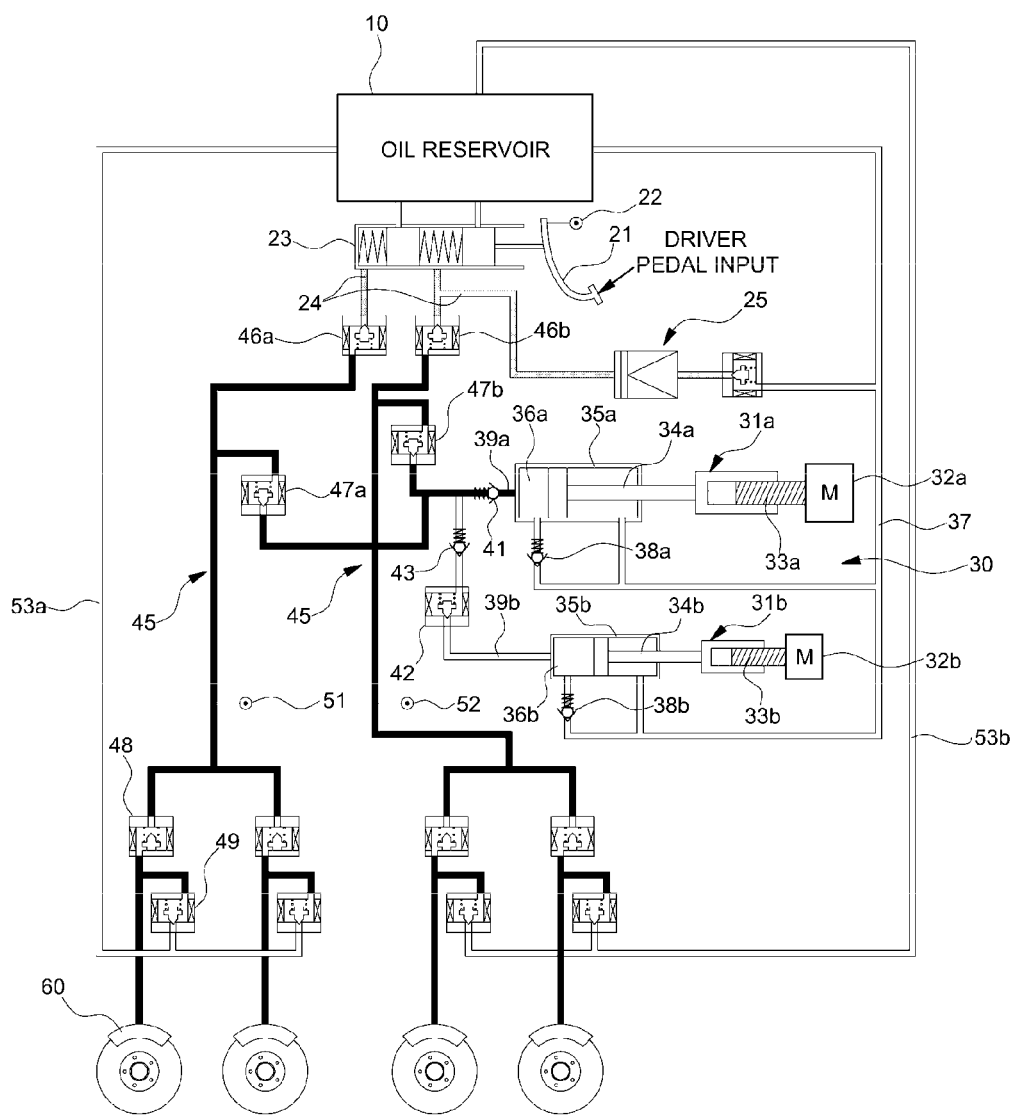
FIG. 1 is a view illustrating an exemplary electro-hydraulic brake system according to the present invention.
Figure 2:
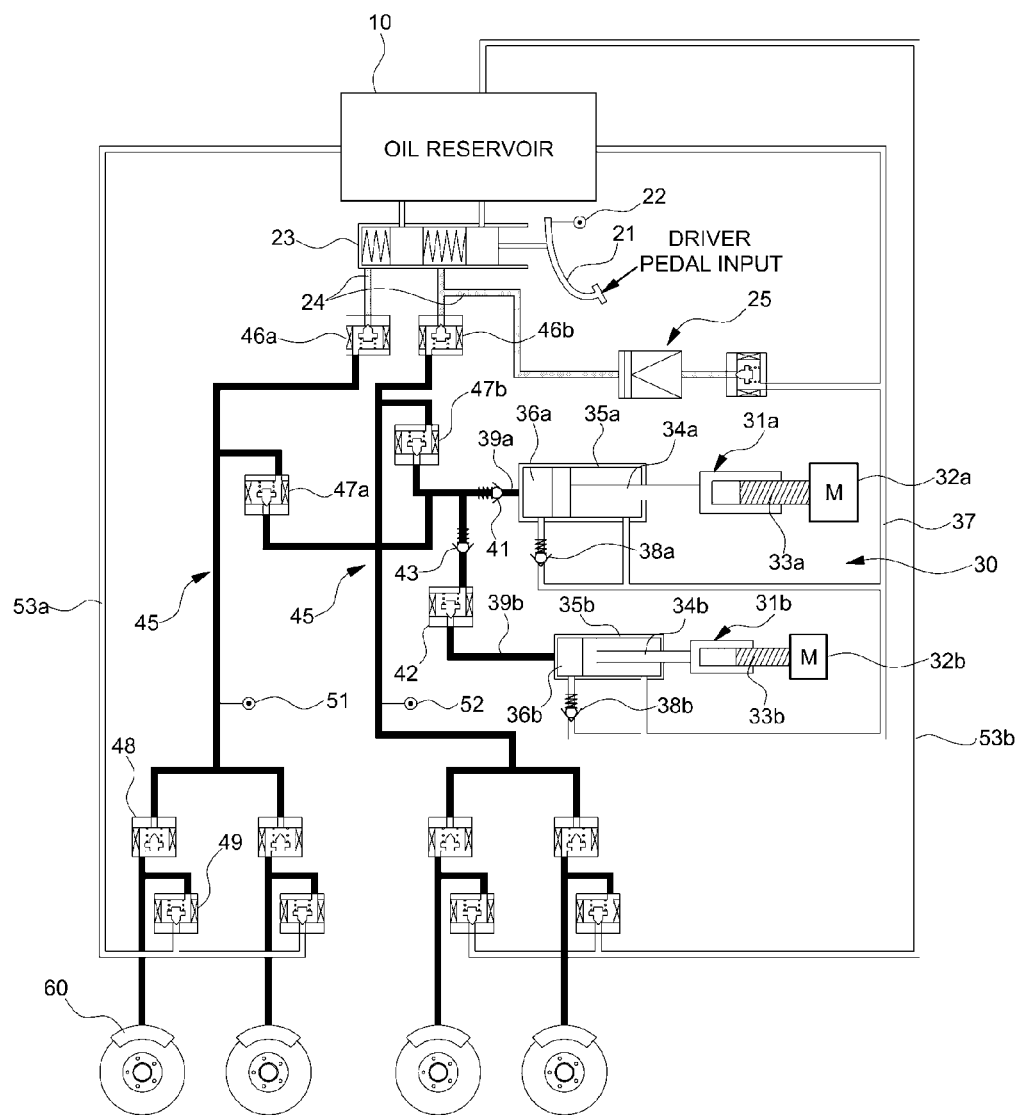
FIGS. 2 and 3 are views illustrating the operating state of an exemplary electro-hydraulic brake system according to the present invention.
Figure 3:
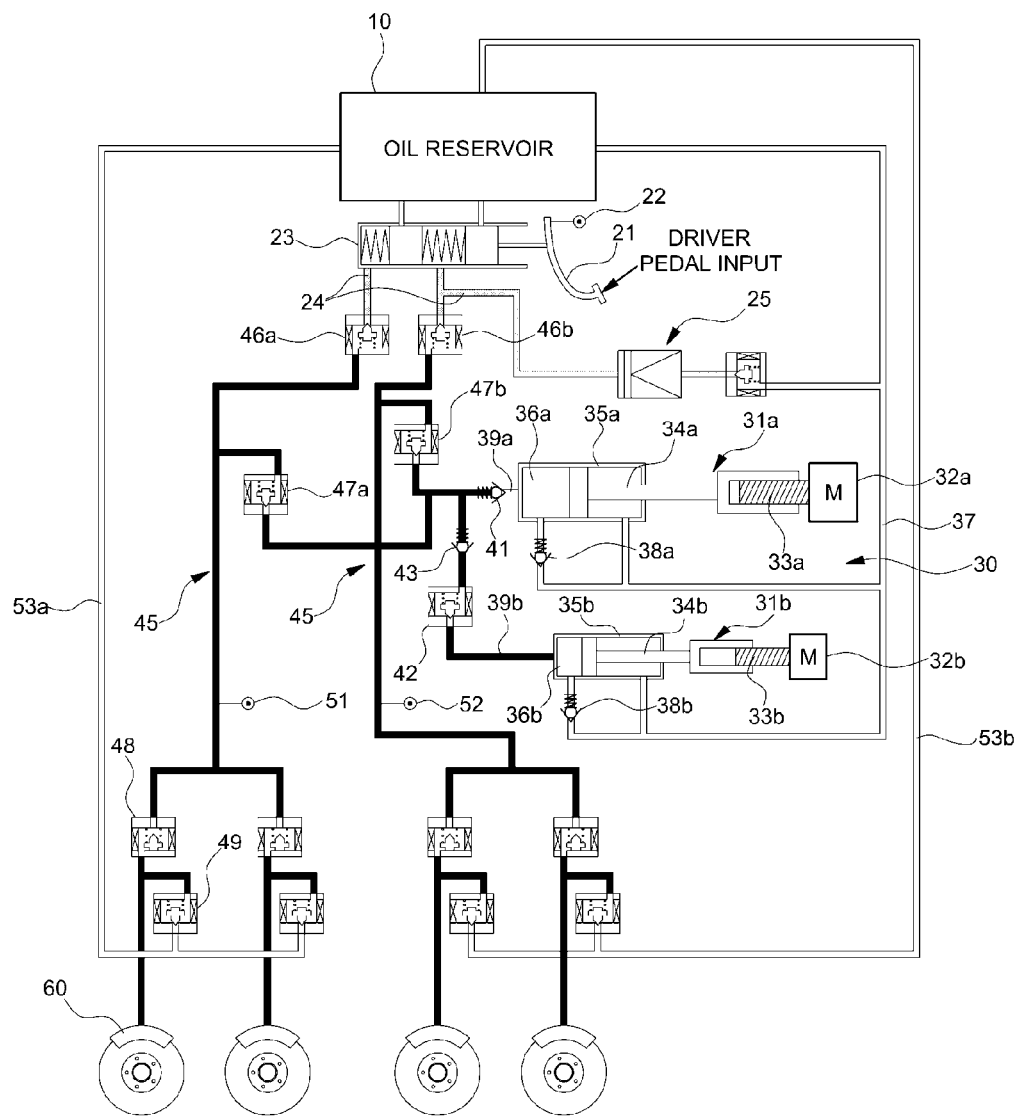

FIG. 1 is a view illustrating an electro-hydraulic brake system according to various embodiments of the present invention. FIGS. 2 and 3 are views illustrating the operating state of an electro-hydraulic brake system according to various embodiments of the present invention.

FIGS. 1 and 2 show a state that a brake hydraulic pressure is generated according to the driver request deceleration during a normal operation. FIG. 1 shows an operating state under a braking condition of requiring high deceleration greater than a set value. FIG. 2 shows an operating state under a braking condition of requiring low deceleration less than the set value.

In addition, FIG. 3 shows a state that the brake hydraulic pressure is generated by using a supplementary pump 31$b$ when a main pump 31$a$ (for example, a motor) is out of order.

Thick solid black lines in FIGS. 1 to 3 illustrate a state that the brake hydraulic pressure is transferred through a hydraulic pressure supply line 45.

An electro-hydraulic brake system according to the present invention includes a brake pedal 21 serving as a brake input device manipulated by a driver to brake a vehicle, a brake input detecting sensor 22 for detecting a brake input value through the brake pedal 21, a pressure generating device 30 for generating a brake hydraulic pressure, a wheel cylinder 60 for receiving the brake hydraulic pressure generated from the pressure generating device 30 to generate braking power for braking rotations of each vehicle wheel, the hydraulic pressure supply line 45 connected between the pressure generating device 30 and the wheel cylinder 60 to transfer the brake hydraulic pressure generated from the pressure generating device 30 to each wheel cylinder 60, and a controller (not shown) for controlling an operation of the pressure generating device 30 in order to generate a target brake hydraulic pressure based on a signal of the brake input detecting sensor 22.

The configuration of the electro-hydraulic brake system will be described in more detail as follows. The electro-hydraulic brake system includes an oil reservoir 10 for storing brake oil, a backup master cylinder 23 connected to the oil reservoir 10 to generate a hydraulic pressure when a driver steps on the brake pedal 21 to press the brake pedal 21 (that is, pedaling force of the driver is applied to the brake pedal), and a pedal simulator 25 connected to the backup master cylinder 23 through the pedal hydraulic pressure line 24 to provide pedal feel through the hydraulic pressure generated from the backup master cylinder 23 according to the pedaling force of the driver.

In addition, the pressure generating device 30 of the electro-hydraulic brake system according to the present invention includes two pumps, that is, the main and supplementary pumps 31$a$ and 31$b$ driven by motors 32$a$ and 32$b$. The main and supplementary pumps 31$a$ and 31$b$ are controlled by the controller.

That is, as the controller controls each operation of the motors 32$a$ and 32$b$, the main and supplementary pumps 31$a$ and 31$b$ generate the target hydraulic pressure. There is no difference between the configurations of the main and supplementary pumps 31$a$ and 31$b$ and that of a motor driving type of a pump used in an electro-hydraulic brake system according to the related art.

In other words, the main and supplementary pumps 31$a$ and 31$b$ are pumps of a piston (plunger) compression type, in which pistons 34$a$ and 34$b$ receive linear force generated by converting torque of motors 32$a$ and 32$b$ and reciprocate by the linear force to control such that the hydraulic pressures are generated. Since the configurations of the pumps are well known to those in the art, the details will be omitted.

For example, in order to convert the torque of the motors 32$a$ and 32$b$ into the linear force of a piston 34$a$ or 34$b$, each of the main and supplementary pumps 31a and 31b may include a ball screw 33a or 33b mounted on the rotational shaft of the motor 32a or 32b to be rotated together with the rotational shaft, and the piston 34a or 34b reciprocating along an inside of the cylinder 35a or 35b to generate the hydraulic pressure when the ball screw 33a or 33b rotates, in a state that the piston 34a or 34b is engaged with an outside of the ball screw 33a or 33b.

In addition, the main and supplementary pumps 31a and 31b may be manufactured in a smaller size than the motor driving type pump used in the electro-hydraulic brake system according to the related art.

In addition, although not exactly depicted in the drawings, the supplementary pump 31b having a smaller size than the main pump 31a may be used.

That is, the size of the supplementary pump 31b may be smaller than that of the main pump 31a.

The pipes and components, such as an oil line 37 installed between the main and supplementary pumps 31a and 31b and the oil reservoir 10 and check valves 38a and 38b installed on the oil line 37, are not different from those of the motor driving type pump used in the electro-hydraulic brake system according to the related art.

However, the two pumps, that is, the main and supplementary pumps 31a and 31b are connected to the hydraulic pressure supply line 45 for supplying the hydraulic pressure to the wheel cylinders 60. Thus, when only anyone of the pumps 31a and 31b is operated, the brake hydraulic pressure generated by the pump may be supplied to the wheel cylinders 60 of each vehicle wheel through the hydraulic pressure supply line 45.

In addition, when both the pump 31a and 31b are operated at the same time, the hydraulic pressures generated by each pump may be transferred to the wheel cylinders 60 of vehicle wheels through the hydraulic pressure supply line 45 at the same time.

To this end, sub-hydraulic pressure lines 39a and 39b for transferring hydraulic pressure, which are connected to pressing chambers 36a and 36b of each pump 31a and 31b, are pipe-connected to the hydraulic pressure supply line 45, where the piston pressing is performed in the pressing chambers 36a and 36b to generate the hydraulic pressure when the pistons 34a and 34b move forward. And, the hydraulic pressure supply line 45 pipe-connected to the sub-hydraulic pressure lines 39a and 39b is connected to the wheel cylinders 60 of each vehicle wheel for transferring hydraulic pressure.

In this case, a check valve 41 may be installed to one of the sub-hydraulic pressure line 39a connected between the pressing chamber 36a of the main pump 31a and the hydraulic pressure supply line 45 and the sub-hydraulic pressure line 39b connected between the pressing chamber 36b of the supplementary pump 31b and the hydraulic pressure supply line 45, and a shut-off valve 42 may be installed to the other sub-hydraulic pressure line.

In addition, a check valve 43 may be further installed to a lower side of the shut-off value 42, that is, the sub-hydraulic pressure line 39b of a lower side between the shut-off value 42 and the hydraulic pressure supply line 45.

In the embodiment shown in FIGS. 1 to 3, the check valve 41 is installed to the sub-hydraulic pressure line 39a connected to the main pump 31a and the shut-off valve 42 is installed to the sub-hydraulic pressure line 39b connected to the supplementary pump 31b.

As described above, of the two sub-hydraulic pressure lines 39a and 39b, the check valve 41 may be located at a position opposite to the shut-off valve 42.

Meanwhile, release valves 47a and 47b are installed to the hydraulic pressure supply line 45 connected to the wheel cylinders 60 of each vehicle wheel, and the hydraulic pressure supply line 45, to which the release valves 47a and 47b are installed, is connected to the wheel cylinders 60 of each vehicle wheel through inlet valves 48 in order to supply the hydraulic pressure generated by at least one of the main and supplementary pumps 31a and 31b.

In addition, pressure sensors 51 and 52 may be installed to the hydraulic pressure supply line 45 connected to each inlet valve 48 in order to detect hydraulic pressures.

In addition, return lines 53a and 53b branched from the hydraulic pressure supply line 45 connected to the wheel cylinders 60 of each vehicle wheel are connected to the oil reservoir 10 through outlet valves 49.

In addition, the hydraulic pressure supply line 45 is connected to a pedal hydraulic pressure line 24 through cut valves 46a and 46b.

The valves including the release valves 47a and 47b, the inlet valves 48, the outlet valves 49, and the cut valves 46a and 46b, the structure of connecting the hydraulic pressure supply line 45 to the wheel cylinders 60 of each vehicle wheel, and the flow path connection structure of pipe-connecting the pedal hydraulic pressure line 24, the hydraulic pressure supply line 45, and the return lines 53a and 53b are not different from those of the related art.

The configuration of the electro-hydraulic brake system according to various embodiments of the present invention has been described. Hereinafter, a method for controlling the same and an operation state will be described.

Figure 4:
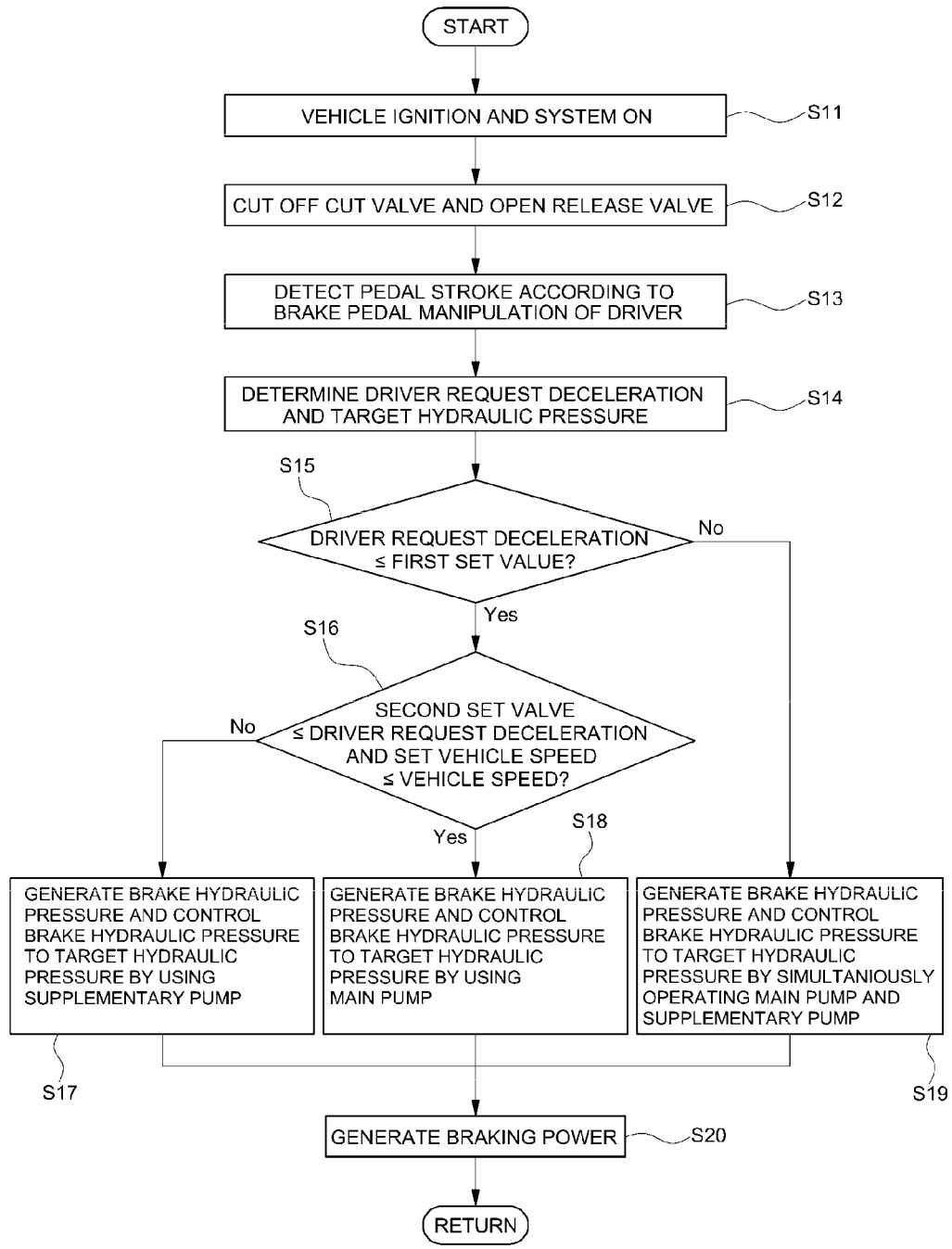
FIG. 4 is a flowchart illustrating a process of controlling an exemplary electro-hydraulic brake system according to the present invention.

FIG. 4 is a flowchart illustrating a control process according to various embodiments of the present invention. When the vehicle is ignited, power is supplied to the controller so that the system is turned on S11. In this case, the two cut valves 46a and 46b are cut off and the two release valves 47a and 47b are opened S12.

Thereafter, when a driver performs a brake input operation by stepping on the brake pedal 21, the pedal stroke is detected through the brake input detecting sensor 22, that is the pedal stroke sensor S13 and the controller determines the braking intention of the driver based on the detected pedal stroke.

At this time, the controller determines the driver request deceleration (D) and the target hydraulic pressure for generating the braking power by using the pedal stroke value corresponding to the driver brake input value S14.

Since the driver request deceleration (D) is a control variable which has already been utilized for conventional vehicle brake control and various schemes and processes of calculating the driver request deceleration (D) have been variously known to those in the art, the present invention is not limited specifically by the schemes and processes of calculating the driver request deceleration (D) and the description will be omitted.

For example, a scheme of calculating the driver request deceleration (D) based on a pedal stroke corresponding to a degree of stepping on a brake pedal 21 by a driver or in addition, information about a vehicle state such as a wheel speed detected by a sensor has been known in the art.

As described above, when the driver request deceleration (D) is calculated, the controller compares the driver request deceleration (D) with the first set value S15. When the driver request deceleration (D) is equal to or less than the first set value (D first set value), as shown in FIG. 1, the controller operates a selected one of the main and supplementary pumps 31a and 31b to generate the hydraulic pressure S17 and S18.

In this case, the controller controls the operation of the motor of the main or supplementary pump 31a or 31b according to the target hydraulic pressure calculated based on the pedal stroke corresponding to the driver brake input value as a target value, such that the brake hydraulic pressure transferred to the wheel cylinders 60 through the hydraulic pressure supply line 45 is generated and controlled. At this time, the signals of the pressure sensors 51 and 52 are used as a feedback signal for controlling the hydraulic pressure to become the target value.

As described above, after the required brake hydraulic pressure is generated by driving the motor 32a of the main pump 31a or the motor 32b of the supplementary pump 31b, the controller transfers the brake hydraulic pressure to each wheel cylinder (wheel brake) 60 to brake the vehicle S19 (braking power generation).

Of course, in order to supply the hydraulic pressure generated by the main or supplementary pump 31a or 31b to each wheel cylinder 60 of vehicle wheels, the inlet valves 48 on the hydraulic pressure supply line 45 are controlled to be opened and the outlet valves 49 on the return lines 53a and 53b are controlled to be closed.

FIG. 1 shows a state of supplying the hydraulic pressure generated by driving the main pump 31a to each wheel cylinder 60 of vehicle wheels.

In the embodiment of the present invention described above, the first set value may be set into 1 g ("g" refers to the gravitational acceleration) as a reference of the deceleration.

Under a low deceleration condition as a conventional braking condition in which the driver request deceleration is equal to or less than 1 g, one of the two pumps is operated to generate the hydraulic pressure. Preferably, a detail condition for selecting one from the two pumps to generate the brake hydraulic pressure may be additionally applied.

That is, according to a preferable embodiment, the controller may be set to select one of the two pumps according to the driver brake input information and the vehicle driving information. In this case, the driver request deceleration (D) determined according to the pedal stroke may be utilized as the driver brake input information, and the vehicle speed information may be utilized as the vehicle driving information.

Thus, when the driver request deceleration is equal to or less than the first set value (e.g. 1 g) and is equal to or greater than the second set value and the vehicle speed is equal to or greater than a set vehicle speed, the controller may be set to operate the main pump 31a in order to generate the hydraulic pressure required to brake the vehicle S16 and S18 (see FIG. 1).

To the contrary, when the driver request deceleration is less than the second set value or the vehicle speed is less than the set vehicle speed, that is, the vehicle is under a low deceleration condition, the controller may be set to operate the supplementary pump 31b in order to generate the hydraulic pressure required to brake the vehicle S16 and S17.

That is, as shown in FIG. 3, the brake hydraulic pressure is generated by driving the motor 32b of the supplementary pump 31b and the brake hydraulic pressure generated by the supplementary pump 31b is transferred to each wheel cylinder (wheel brake) 60 through the hydraulic pressure supply line 45.

In this case, the second set value may be set to be equal to 0.3 g and the set vehicle speed may be set to be equal to 60 km/h.

In addition, when the vehicle is under a high deceleration condition that the driver request deceleration (D) is greater than the first set value (e.g. 1 g) in step S15 (D>first set value), as shown in FIG. 2, all the main and supplementary pumps 31a and 31b are operated to generate the hydraulic pressure S19.

When all the main and supplementary pumps 31a and 31b are operated, the hydraulic pressures generated by both pumps meet at the hydraulic pressure supply line 45, so that a hydraulic pressure relatively higher than that under the low deceleration condition may be generated.

In this case, the controller drives and controls the motors 32a and 32b of the main and supplementary pumps 31a and 31b according to the target hydraulic pressure as a target value in order to control the hydraulic pressure transferred to the wheel cylinders 60 through the hydraulic pressure supply line 45. At this time, the signals of the pressure sensors 51 and 52 are used as a feedback signal for controlling the hydraulic pressure to become the target value.

As described above, after the controller drives all the motors 32a and 32b of the main and supplementary pumps 31a and 31b to generate the required hydraulic pressure, the controller allows the hydraulic pressure to be transferred to each wheel cylinder (wheel brake) 60 to brake the vehicle.

At this time, the hydraulic pressure generated from both pumps 31a and 31b and transferred through the hydraulic pressure supply line 45 must meet the required hydraulic pressure. To this end, since there is a need for the hydraulic pressure generated by the main and supplementary pumps 31a and 31b to be suitably assigned, the controller may be set to assign the hydraulic pressure to the two pumps according to a preset ratio under the requirement of meeting the required hydraulic pressure.

In addition, in order to supply the hydraulic pressure generated by the main and supplementary pumps 31a and 31b to each wheel cylinder 60 of the vehicle wheels, the inlet valves 48 on the hydraulic pressure supply line 45 are controlled to be opened and the outlet valves 49 on the return lines 53a and 53b are controlled to be closed.

In addition, when the ABS is operated and the occurrence of a brake fade is sensed, it may be set to generate the required hydraulic pressure by operating all the main and supplementary pumps 31a and 31b in the same scheme as in the high deceleration condition.

When the brake fade occurs, even though the target hydraulic pressure is generated, the required braking power is not generated and the vehicle speed is not decelerated. Thus, when it is determined based on the signal from a longitudinal acceleration sensor that the real speed of the vehicle is not decelerated although the controller operates the pumps to generate the target hydraulic pressure (or when the deceleration of the vehicle speed is greatly less than the driver request deceleration), the controller may determine that the brake fade occurs.

Meanwhile, FIG. 3 shows a state that the brake hydraulic pressure required when the main pump 31a is out of order is generated. When the controller senses the error of the main pump 31a, the controller operates the supplementary pump 31b to generate the hydraulic pressure.

When the error of the supplementary pump 31b is sensed, the controller operates the main pump 31a to generate the hydraulic pressure. Thus, when anyone of the pumps is out of order, the controller uses the other normal pump to generate the hydraulic pressure, so that the brake power for the wheel brake may be generated.

In this case, the errors of the pumps 31*a* and 31*b* may include errors of the motors 32*a* and 32*b* or inverters for driving the motors (for example, a short-circuit error).

In addition, position sensors (not shown) for detecting a position of a piston stroke may be installed to the pumps 31*a* and 31*b* in order to sense the errors of the pumps. The controller may sense the errors of the pumps 31*a* and 31*b* by using the position sensors or the pressure sensors 51 and 52 on the hydraulic pressure supply line 45 together with the pedal stroke sensor 22.

That is, when the pedal stroke value is sensed through the pedal stroke sensor 22 and the controller determines that the hydraulic pressure corresponding to the control signal according to the signals from the pressure sensors 51 and 52 is not generated even in the state that the controller outputs a motor control signal to operate the pump 31*a* and 31*b* selected according to the above-described deceleration condition, it is possible to determine that the currently controlled pump is out of order.

In addition, when the position of the piston stroke corresponding to the control signal is not detected through the position sensor in a state that the motor control signal is output to operate the pumps 31*a* and 31*b*, it is possible to determine that the currently controlled pump is out of order.

Therefore, according to the electro-hydraulic brake system and the method for controlling the same of the present invention, two pumps, that is, both the main pump and supplementary pump, which are employed to generate a brake hydraulic pressure, may be selectively operated according to the driver braking intention and the braking condition, so that the problems of the weight and manufacturing cost of the electro-hydraulic brake system having one pump having a large size according to the related art may be improved. In addition, even when anyone of the pumps is out of order, the other normal pump may be used to generate braking power, so that it is possible to prevent deterioration of brake stability and an increase in braking distance.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electro-hydraulic brake system comprising:
   a brake input device manipulated by a driver to brake a vehicle;
   a brake input detecting sensor configured to detect a brake input value of the driver through the brake input device;
   a pressure generating device configured to generate a brake hydraulic pressure;
   a wheel cylinder configured to receive the brake hydraulic pressure generated from the pressure generating device and to generate braking power for braking rotations of each vehicle wheel;
   a hydraulic pressure supply line connected between the pressure generating device and the wheel cylinder to transfer the brake hydraulic pressure generated from the pressure generating device to each wheel cylinder; and
   a controller configured to output a control signal for controlling an operation of the pressure generating device in order to allow the pressure generating device to generate a target brake hydraulic pressure based on a signal of the brake input detecting sensor,
   wherein the pressure generating device includes a main pump and a supplementary pump, each of which generates a brake hydraulic pressure according to the control signal of the controller and is connected to the hydraulic pressure supply line to transfer the generated brake hydraulic pressure through the hydraulic pressure supply line,
   wherein the controller is configured to determine a driver request deceleration based on the brake input value of the driver detected by the brake input device, and to select one from the main and supplementary pumps according to the determined driver request deceleration to operate the selected pump or all the main and supplementary pumps, such that the brake hydraulic pressure is generated,
   wherein the controller is configured to operate all the main and supplementary pumps when the determined driver request deceleration is greater than a first set value, and
   wherein one selected from the main and supplementary pumps when the determined driver request deceleration is equal to or less than the first set value to generate the brake hydraulic pressure.

2. The electro-hydraulic brake system of claim 1, wherein the brake input detecting sensor includes a pedal stroke sensor for detecting a stroke of a brake pedal which serves as a brake input device.

3. The electro-hydraulic brake system of claim 1, wherein the main pump and the supplementary pump are piston compression pumps, in each of which a piston receives linear force, into which torque of a motor controlled according to the control signal of the controller is converted, to reciprocate in a cylinder, such that brake oil in the cylinder is pressed against to generate the brake hydraulic pressure.

4. The electro-hydraulic brake system of claim 3, wherein each of the main pump and the supplementary pump includes:
   a motor driven according to the control signal of the controller;
   a ball screw mounted on a rotational shaft of the motor to be rotated together with the rotational shaft; and
   a piston operated by the linear force, into which the torque of the motor is converted through the ball screw in a state that the piston is engaged with the ball screw, to press against the brake oil in the cylinder.

5. The electro-hydraulic brake system of claim 1, wherein the hydraulic pressure supply line is connected to a sub-hydraulic pressure line connected to each pump, such that the brake hydraulic pressures generated by at least one of the main and supplementary pumps are transferred simultaneously or separately through the hydraulic supply line, and
   wherein the electro-hydraulic brake system further comprises a check valve disposed on one of a sub-hydraulic pressure line connected from the main pump to the hydraulic pressure supply line and a sub-hydraulic pressure line connected from the supplementary pump to the hydraulic pressure supply line, and a shut-off valve disposed in the another sub-hydraulic pressure line.

6. The electro-hydraulic brake system of claim 1, further comprising:
a backup master cylinder connected to a brake pedal serving as the brake input device to generate a hydraulic pressure when the brake pedal is manipulated; and
a pedal simulator connected to the backup master cylinder through a pedal hydraulic line to provide pedal feel through the hydraulic pressure generated from the backup master cylinder according to pedaling force of a driver,
wherein the controller is set to separate the pedal hydraulic pressure line and the hydraulic pressure supply line from each other by closing a cut valve between the pedal hydraulic pressure line and the hydraulic pressure supply line and to open a release valve of the hydraulic pressure supply line, such that the brake hydraulic pressure is generated and transferred to the wheel cylinder.

7. The electro-hydraulic brake system of claim 1, wherein the controller is configured to operate the main pump when the determined driver request deceleration is equal to or less than the first set value and equal to or greater than a second set value and a vehicle speed is equal to or greater than a set vehicle speed, and to operate the supplementary pump when the determined driver request deceleration is less than the second set value or a vehicle speed is less than the set vehicle speed.

8. The electro-hydraulic brake system of claim 1, wherein the controller is configured to operate all the main and supplementary pumps to generate the brake hydraulic pressure when an anti-lock brake system (ABS) is operated or occurrence of a brake fade is sensed.

9. The electro-hydraulic brake system of claim 1, wherein the controller is configured to operate a normal pump of the main and supplementary pumps to generate the brake hydraulic pressure when it is sensed that one of the main and supplementary pumps is abnormal.

10. A method of controlling an electro-hydraulic brake system, the method comprising:
determining, by a controller, a target hydraulic pressure for generating a brake power based on a driver brake input value detected by a brake input detecting sensor when a driver manipulates a brake input device in order to brake a vehicle;
selecting, by the controller, one from main and supplementary pumps connected to a hydraulic pressure supply line in order to generate the brake hydraulic pressure based on the driver brake input value;
operating, by the controller, one selected from the main and supplementary pumps or all the main and supplementary pumps according to the driver brake input value in order to generate and control a brake hydraulic pressure according to the determined target hydraulic pressure as a target value; and
generating braking force, by the controller, for braking rotations of vehicle wheels by transferring the generated brake hydraulic pressure to wheel cylinders of each vehicle wheel through the hydraulic pressure supply line,
wherein a driver request deceleration is determined based on the brake input value of the driver detected by the brake input device, and one or all of the main and supplementary pumps is selected according to the determined driver request deceleration to operate the selected pump or all the main and supplementary pumps, such that the brake hydraulic pressure is generated,
wherein the main and supplementary pumps are simultaneously operated when the determined driver request deceleration is greater than a first set value, and
wherein one selected from the main and supplementary pumps is operated to generate the brake hydraulic pressure when the determined driver request deceleration is equal to or less than the first set value.

11. The method of claim 10, wherein the brake input detecting sensor is a pedal stroke sensor for detecting a stroke of a brake pedal serving as a brake input device.

12. The method of claim 10, wherein the main pump and the supplementary pump are piston compression pumps, in each of which a piston receives linear force, into which torque of a motor is converted, to reciprocate in a cylinder, such that brake oil in the cylinder is pressed to generate the brake hydraulic pressure.

13. The method of claim 10, wherein the electro-hydraulic brake system includes a backup master cylinder connected to a brake pedal serving as the brake input device to generate a hydraulic pressure when the brake pedal is manipulated, and a pedal simulator connected to the backup master cylinder through a pedal hydraulic pressure line to provide pedal feel through the hydraulic pressure generated from the backup master cylinder according to pedaling force of a driver, and
wherein the pedal hydraulic pressure line and the hydraulic pressure supply line are separated from each other by closing a cut valve between the pedal hydraulic pressure line and the hydraulic pressure supply line before the brake hydraulic pressure is generated, and
wherein a release valve of the hydraulic pressure supply line is opened such that the brake hydraulic pressure generated by one or all of the main and supplementary pumps is transferred to the wheel cylinders of each vehicle wheel through the hydraulic pressure supply line.

14. The method of claim 10, wherein the main pump is operated when the determined driver request deceleration is equal to or less than the first set value and equal to or greater than a second set value and a vehicle speed is equal to or greater than a set vehicle speed, and
the supplementary pump is operated when the determined driver request deceleration is less than the second set value or the vehicle speed is less than the set vehicle speed.

15. The method of claim 10, wherein all the main and supplementary pumps are simultaneously operated to generate the brake hydraulic pressure when an anti-lock brake system (ABS) is operated or occurrence of a brake fade is sensed.

16. The method of claim 10, wherein a normal pump of the main and supplementary pumps is operated to generate the brake hydraulic pressure when it is sensed that one of the main and supplementary pumps is abnormal.

* * * * *